United States Patent
Lee

(10) Patent No.: US 11,437,937 B2
(45) Date of Patent: Sep. 6, 2022

(54) CONTROL CIRCUIT AND DISHWASHER COMPRISING THE SAME

(71) Applicant: LG Electronics Inc., Seoul (KR)

(72) Inventor: Soongkeun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 16/900,066

(22) Filed: Jun. 12, 2020

(65) Prior Publication Data

US 2020/0395874 A1    Dec. 17, 2020

(30) Foreign Application Priority Data

Jun. 14, 2019  (KR) .................. 10-2019-0070904

(51) Int. Cl.
*H02P 5/74* (2006.01)
*A47L 15/00* (2006.01)

(52) U.S. Cl.
CPC ............ *H02P 5/74* (2013.01); *A47L 15/0028* (2013.01); *A47L 15/0031* (2013.01)

(58) Field of Classification Search
CPC .......... H02M 1/12; A47L 15/0031; H02P 5/00
See application file for complete search history.

(56) References Cited

U.S. PATENT DOCUMENTS

| | | |
|---|---|---|
| 2004/0012350 A1 | 1/2004 | Weinmann |
| 2008/0088187 A1 | 4/2008 | Shao et al. |
| 2015/0003124 A1 | 1/2015 | Sakai et al. |
| 2022/0115173 A1* | 4/2022 | Hyttel ............... H01F 17/06 |

FOREIGN PATENT DOCUMENTS

| | | |
|---|---|---|
| JP | H09266677 | 10/1997 |
| JP | 2001286175 | 10/2001 |

OTHER PUBLICATIONS

Extended European Search Report in European Application No. 20179194.4, dated Nov. 9, 2020, 10 pages.
Miloudi et al., "Common Mode and Differential Mode Characteristics of AC Motor for EMC Analysis," International Symposium on Electromagnetic Compatibility, Wroclaw, Poland, dated Sep. 5-9, 2016, 5 pages, XP032995819.
Mirafzal et al., "Determination of Parameters in the Universal Induction Motor Model," Industry Applications Conference, dated Sep. 2007, 10 pages, XP031146080.
Wang et al., "High-Frequency Modeling of the Long-Cable-Fed Induction Motor Drive System Using TLM Approach for Predicting Overvoltage Transients," IEEE Transactions on Power Electronics, vol. 25, No. 10, dated Oct. 2010, 12 pages, XP011306373.

\* cited by examiner

*Primary Examiner* — Said Bouziane
(74) *Attorney, Agent, or Firm* — Fish & Richardson P.C.

(57) ABSTRACT

A control circuit includes: a converter configured to convert alternating current (AC) power into direct current (DC) power, an inverter configured to generate driving power of at least one motor using the converted DC power, and a first core formed by winding a coil by a number of windings determined in correspondence with an impedance of the at least one motor. The number of windings is determined such that an impedance of the first core is inversely proportional to the impedance of the at least one motor and a driving power line for driving the at least one motor passes through a center of the first core.

20 Claims, 2 Drawing Sheets

CONTROL CIRCUIT AND DISHWASHER COMPRISING THE SAME

CROSS-REFERENCE TO RELATED APPLICATION

Pursuant to 35 U.S.C. § 119(a), the present disclosure claims priority to and the benefit of Korean Patent Application No. 10-2019-0070904, filed on Jun. 14, 2019, the disclosure of which is incorporated herein in its entirety.

TECHNICAL FIELD

The present disclosure relates to a control circuit and a dishwasher having the same.

BACKGROUND

In general, electromagnetic interference (EMI) of electronic components occurs due to a switching frequency generated by a switching operation and a harmonic component of the frequency. In particular, the EMI mainly occurs in a switched mode power supply (SMPS) integrated circuit (IC) and a motor in a dishwasher.

In the related art, EMI occurred in the SMPS IC has been suppressed using a resistor-capacitor-diode (RCD) snubber in which a resistor, a capacitor, and a diode are combined, and EMI occurred in the motor has been suppressed using a harness core.

However, of the suppressing methods in the related art, the harness core has to be wound by a large number of turns in order to have a large inductance. Therefore, there is a difficulty in product development due to an increased cost and a large core volume.

In addition, the related art methods have a problem that it is impossible to further suppress noise emitted to outside of the motor.

SUMMARY

The present disclosure has been invented to overcome the above-mentioned problems, and an aspect of the present disclosure is to provide a control circuit, effectively suppressing electromagnetic interference (EMI) while reducing a volume of a product and a manufacturing cost, and a dishwasher including the same.

Another aspect of the present disclosure is to provide a control circuit, capable of lowering a level of additionally generated harmonic noise by cancelling noise generated at a primary resonant frequency of a motor.

The aspects to achieve in this disclosure are not limited to those aspects mentioned above, and other non-mentioned technical problems to be solved in this disclosure can be clearly understood by those skilled in the art by the following description.

In order to achieve these and other advantages and in accordance with the purpose of this specification, as embodied and broadly described herein, there is provided a control circuit, including a converter configured to convert alternating current (AC) power into direct current (DC) power, an inverter configured to generate driving power of at least one motor using the DC power, and a first core formed by winding a coil by a number of windings determined in correspondence with an impedance of the motor. The number of windings may be determined that an impedance of the first core is inversely proportional to the impedance of the motor, and a driving power line for driving the motor may pass through a center of the first core.

In one embodiment, the motor of the control circuit may be a three-phase motor driven by three driving power applied to a first power line, a second power line, and a third power line, respectively, and the first to third power lines may pass through the center of the first core.

In one embodiment, the number of windings may be determined such that the impedance of the first core exceeds the impedance of the motor in a first range of operating frequencies of the motor of the control circuit.

In one embodiment, the first range of the control circuit may be a range between a first operating frequency and a second operating frequency, and a difference between the impedance of the first core and the impedance of the motor may be the greatest at a central frequency of the first range.

In one embodiment, the central frequency may be a primary resonant frequency of the motor.

In one embodiment, the control circuit may further include a relay configured to perform a switching operation of the first power line and the second power line, and a control unit configured to control the inverter and the relay.

In one embodiment, the relay of the control circuit may control the switching operation so that the first power line and the second power line are connected to a first motor in a first state, and control the switching operation so that the first power line and the second power line are connected to a second motor in a second state.

In one embodiment, the inverter may be configured to generate the three driving power using the DC power to correspond to a load condition of the motor.

In one embodiment, the control circuit may further include a second core disposed between an external power source and the converter. The central frequency may be 450 kHz, the first operating frequency may be 350 kHz, and the second operating frequency may be 550 kHz. The number of windings may be 19Ø or 14Ø.

In one embodiment, the external power source may be a commercial AC power source.

The first state may be a default state of the relay. The first motor may be controlled to perform a washing operation in the first state, and the second motor may be controlled to perform a draining operation in the second state.

In order to achieve these and other advantages and in accordance with the purpose of this specification, as embodied and broadly described herein, there is provided a dishwasher including a control circuit. The control circuit may include a converter configured to convert alternating current (AC) power into direct current (DC) power, an inverter configured to generate driving power of at least one motor using the DC power, and a first core formed by winding a coil by a number of windings determined in correspondence with an impedance of the motor. The number of windings may be determined that an impedance of the first core is inversely proportional to the impedance of the motor, and a driving power line for driving the motor may pass through a center of the first core.

In one embodiment, the motor of the dishwasher may be a three-phase motor driven by three driving power applied to a first power line, a second power line, and a third power line, respectively, and the first to third power lines may pass through the center of the first core.

In one embodiment, the number of windings may be determined such that the impedance of the first core exceeds the impedance of the motor in a first range of operating frequencies of the motor of the dishwasher.

In one embodiment, the first range of the dishwasher may be a range between a first operating frequency and a second operating frequency, and a difference between the impedance of the first core and the impedance of the motor may be the greatest at a central frequency of the first range.

In one embodiment, the central frequency may be a primary resonant frequency of the motor.

In one embodiment, the control circuit may further include a relay configured to perform a switching operation of the first power line and the second power line, and a control unit configured to control the inverter and the relay.

In one embodiment, the relay of the dishwasher may control the switching operation so that the first power line and the second power line are connected to a first motor in a first state, and control the switching operation so that the first power line and the second power line are connected to a second motor in a second state.

In one embodiment, the inverter of the dishwasher may be configured to generate the three driving power using the DC power to correspond to a load condition of the motor.

In one embodiment, the control circuit of the dishwasher may further include a second core disposed between an external power source and the converter. The central frequency may be 450 kHz, the first operating frequency may be 350 kHz, and the second operating frequency may be 550 kHz. The number of windings may be 19Ø or 14Ø.

In one embodiment, the external power source may be a commercial AC power source. The first state may be a default state of the relay. The first motor may be controlled to perform a washing operation in the first state, and the second motor may be controlled to perform a draining operation in the second state.

In a control circuit and a dishwasher including the same according to implementations, EMI can be effectively suppressed while reducing a volume of a product and lowering a manufacturing cost.

Also, in the control circuit and the dishwasher including the same according to the implementations, a level of additionally generated harmonic noise can be lowered by offsetting noise generated at a primary resonant frequency of a motor.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, a dishwasher according to an implementation will be described with reference to FIG. 1.

Figure 1:
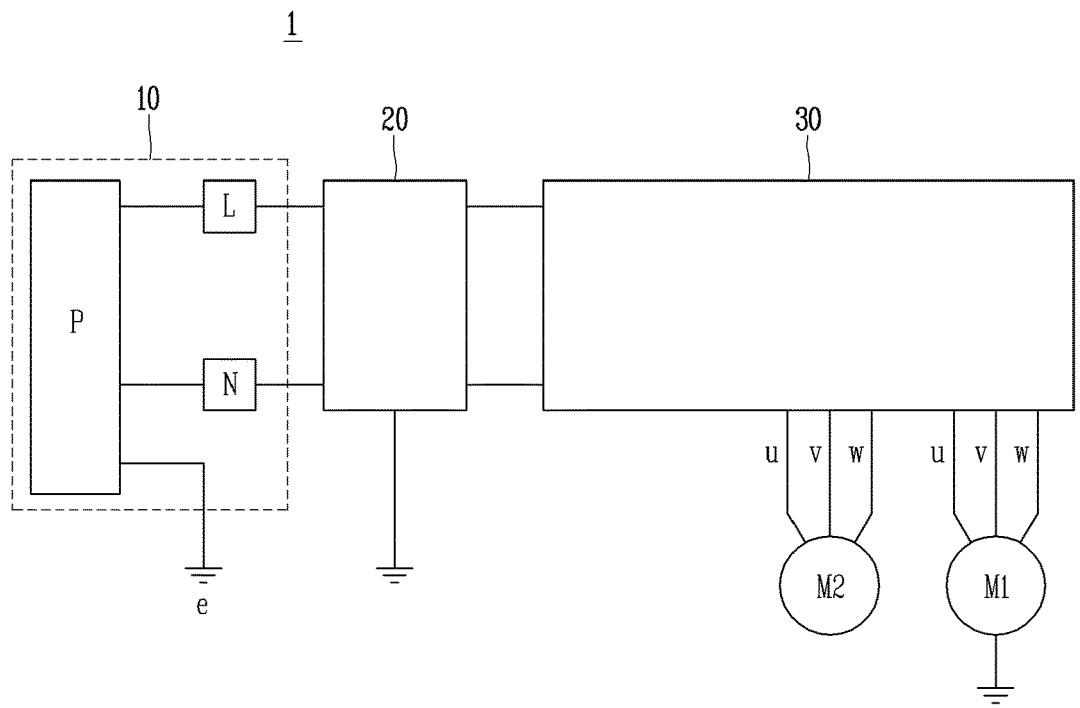
FIG. 1 is a diagram illustrating a part of configuration of a dishwasher in accordance with an embodiment.

FIG. 1 is a diagram illustrating a part of configuration of a dishwasher in accordance with an embodiment.

Referring to FIG. 1, a dishwasher 1 according to an embodiment may include a power supply unit 10, a noise filter 20, a control circuit 30, a first motor M1, and a second motor M2.

The dishwasher 1 is configured to shield electromagnetic interference (EMI) which occurs in the first motor M1 and the second motor M2 by using a first core and a second core included in the control circuit 30. A detailed description of shielding EMI through the first core and the second core will be described later.

The power supply unit 10 is configured to supply power for driving or operating the first motor M1 and the second motor M2. The power supply unit 10 may include an alternating current (AC) power source connection part p connected to a commercial AC power source, and a rectifying circuit (not illustrated) for converting AC power supplied from the commercial AC power source into direct current (DC) power. Specifically, the AC power source connection part p may be provided with a cord and a cord reel.

An AC power source connected through the AC power source connection part p is a commercial AC power source that includes a first power line (i.e., live line L) and a second power line (i.e., neutral line N).

The noise filter 20 is disposed between the power supply unit 10 and the control circuit 30 to have a predetermined interval from the control circuit 30, and configured to remove noise included in the first power line L and/or the second power line N of the power supply unit 10.

The noise filter 20 may be configured as any filter as long as it is a filter capable of removing noise from a power line.

The first motor M1 is driven by first to third power lines u, v, and w. The connection of the first power line u and the second power line v is controlled through a relay (see a relay 36 in FIG. 2). The third power line w of the first motor M1 is shorted from a third power line w of the second motor M2 through a node n (see FIG. 2). The first motor M1 is configured such that dirty water generated after washing dishes in the dishwasher 1 can be drained in a draining mode.

The second motor M2 is driven by first to third power lines u, v, and w. The connection of first power line u and the second power line v is controlled through the relay (see the relay 36 in FIG. 2). The third power line w is shorted from the third power line w of the first motor M1 through the node n (see FIG. 2). The second motor M2 is configured such that water required for washing dishes in the dishwasher 1 is fed.

The control circuit 30 is disposed on a printed circuit board (PCB) substrate, and is configured to connect the first to third power lines u, v, and w to the first motor M1 and the second motor M2, respectively, so that the first motor M1 and the second motor M2 are driven by using power supplied via the noise filter 20.

Hereinafter, the control circuit 30 according to the embodiment will be described with reference to FIG. 2.

Figure 2:
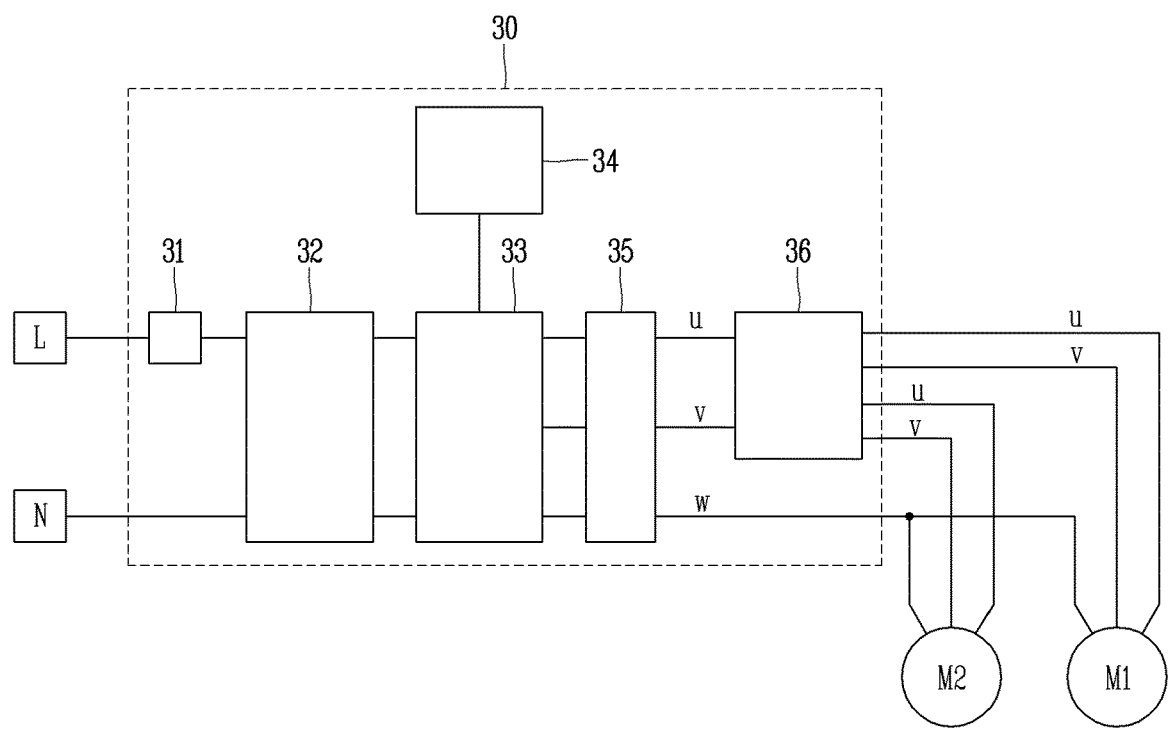
FIG. 2 is a diagram illustrating a control circuit included in the dishwasher of FIG. 1.

FIG. 2 is a diagram illustrating the control circuit 30 included in the dishwasher 1 of FIG. 1.

Referring to FIG. 2, the control circuit 30 according to the embodiment includes a first core 31, a converter 32, an inverter 33, a control unit 34, a second core 35, and a relay 36.

The first core 31 may be disposed between the power supply unit 10 and the converter 32 and may accumulate or discharge power supplied from the power supply unit 10. The first core 31 may function to limit a harmonic current due to high-speed switching of the converter 32. The first core 31 may be a common mode (CM) core.

The converter 32 converts and outputs commercial AC power that has passed through the first core 31 into DC power under the control of a converter control circuit (not illustrated).

The inverter 33 generates driving power of three phases u, v, and w applied to the first motor M1 and the second motor M2, respectively, by using an output voltage of the converter 32 under the control of the control unit 34.

Specifically, the inverter 33 is a power conversion device that converts voltage and frequency of driving power supplied to the first motor M1 and the second motor M2. The inverter 33 generates first to third driving power u, v, and w by varying the output voltage and frequency of the converter 32 to correspond to load conditions of the first motor M1 and the second motor M2, under the control of the control unit 34.

The control unit 34 is configured to control the relay 36 and the inverter 33, and may be an MCU or a microcomputer, but the embodiment is not limited thereto.

The second core 35 may be designed in consideration of motor impedances of the first motor M1 and the second motor M2. A specific method of designing the second core 35 will be described later.

The relay 36 is configured to perform a switching operation with respect to the first power line u and the second power line v so that the first motor M1 or the second motor M2 is driven in a predetermined operation mode of the dishwasher 1 according to the control of the control unit 34.

In detail, the first power line u and the second power line v may be connected to the second motor M2 in a default state of the relay 36 (corresponding to a washing mode of the dishwasher 1).

Therefore, in the washing mode of the dishwasher 1, the relay 36 is controlled by the control unit 34 to connect the first power line u and the second power line v to the second motor M2. The second motor M2 is driven by the first to third power lines u, v, and w.

In addition, the first power line u and the second power line v may be connected to the first motor M1 in a driven state of the relay 36 (corresponding to a draining mode of the dishwasher 1).

Therefore, in the draining mode of the dishwasher 1, the relay 36 is controlled by the control unit 34 to connect the first power line u and the second power line v to the first motor M1. The first motor M1 is driven by the first to third power lines u, v, and w.

Hereinafter, a method of designing a second core according to an embodiment will be described in detail with reference to FIG. 3.

Figure 3:
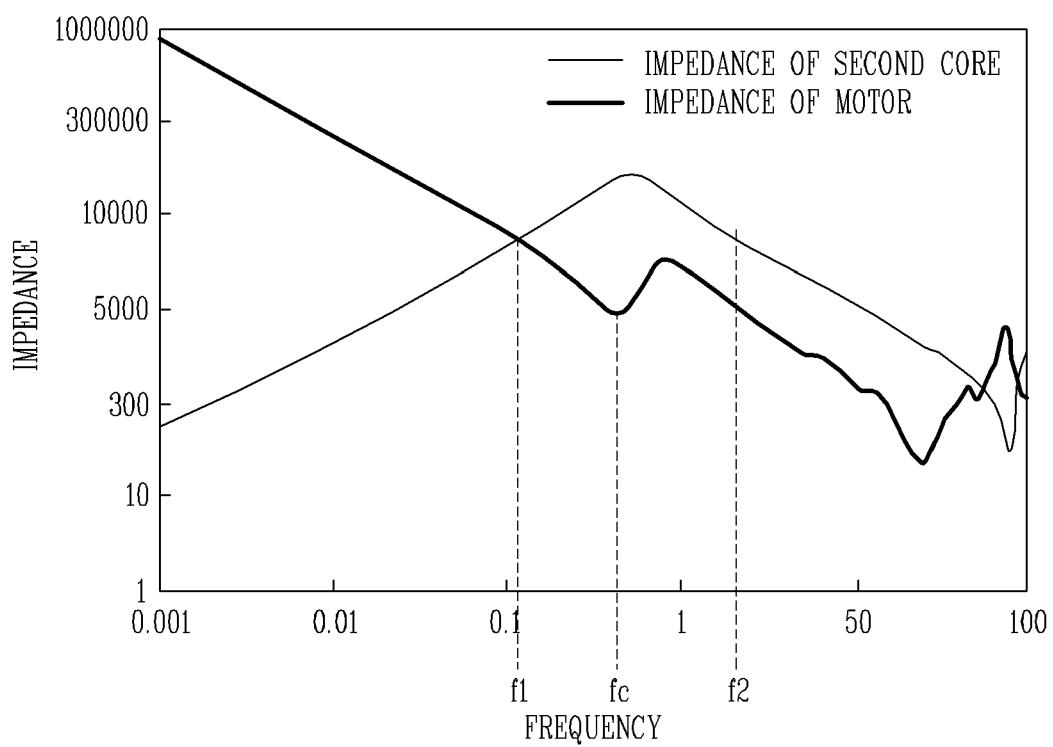
FIG. 3 is a diagram illustrating an impedance of a second core and an impedance of a motor in accordance with an embodiment.

FIG. 3 is a diagram illustrating an impedance of a second core and an impedance of a motor in accordance with an embodiment.

Referring to FIG. 3, impedances of the first motor M1 and the second motor M2 are drastically reduced at a reference frequency fc (about 450 kHz). This is caused by a common mode (CM) of the first motor M1 and the second motor M2.

In order to offset the impedance reduction, the second core 35 may be formed by winding a coil by a number of windings or turns (hereinafter, referred to as the number of windings) which is determined to correspond to the common mode of the first motor M1 and the second motor M2.

Specifically, as illustrated in FIG. 3, a frequency corresponding to a point at which the impedance IMPEDANCE of the first motor M1 and the second motor M2 is drastically lowered is referred to as a reference frequency fc.

The number of windings of the second core 35 may be designed so that the impedance of the second core 35 exceeds the impedance of the first motor M1 and the second motor M2 in a frequency range between a first frequency f1 (e.g., 350 kHz) and a second frequency f2 (e.g., 550 kHz) in which the reference frequency fc is included.

Here, the number of windings of the second core 35 may be set so that the second core 35 has the largest impedance with respect to the reference frequency fc, and the number of windings may be 19Ø or 14Ø, but the embodiment is not limited thereto.

The reference frequency fc may be a primary resonant frequency of the first motor M1 and the second motor M2, but the embodiment is not limited thereto.

Therefore, noise generated in the frequency range based on the reference frequency fc of the first motor M1 and the second motor M2 can be cancelled by the second core 35, thereby lowering a level of additionally generated harmonic noise.

For convenience of description, the foregoing description has been given of the example in which the relay 36 switches the connection of the first power line u and the second power line v, and the first power line u and the second power line v are connected to the first motor M1 in the default state of the relay 36. However, the embodiment is not limited thereto.

Although the implementations of the present disclosure have been described in detail above, the scope of the present disclosure is not limited thereto, and various modifications and improvements made by those skilled in the art using the basic concept of the present disclosure defined in the following claims of the present disclosure will also belong to the claims of the present disclosure. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A control circuit, comprising:
a converter configured to convert alternating current (AC) power into direct current (DC) power;
an inverter configured to generate driving power of at least one motor using the converted DC power; and
a first core formed by winding a coil by a number of windings determined in correspondence with an impedance of the at least one motor,
wherein the number of windings is determined such that an impedance of the first core is inversely proportional to the impedance of the at least one motor, and
wherein a driving power line for driving the at least one motor passes through a center of the first core.

2. The control circuit of claim 1, wherein the at least one motor is a three-phase motor driven by three driving power applied to a first power line, a second power line, and a third power line, respectively, and
wherein the first power line, the second power line, and the third power line pass through the center of the first core.

3. The control circuit of claim 2, wherein the number of windings is determined such that the impedance of the first core exceeds the impedance of the at least one motor in a first range of operating frequencies of the at least one motor.

4. The control circuit of claim 3, wherein the first range is a range between a first operating frequency and a second operating frequency, and
wherein a difference between the impedance of the first core and the impedance of the at least one motor is the greatest at a central frequency of the first range.

5. The control circuit of claim 4, wherein the central frequency is a primary resonant frequency of the at least one motor.

6. The control circuit of claim 5, further comprising:
a relay configured to perform a switching operation of the first power line and the second power line; and
a control unit configured to control the inverter and the relay.

7. The control circuit of claim 6, wherein the relay controls the switching operation such that the first power line and the second power line are connected to a first motor of the at least one motor in a first state, and the first power line and the second power line are connected to a second motor of the at least one motor in a second state.

8. The control circuit of claim 7, wherein the inverter is configured to generate the three driving power using the DC power corresponding to a load condition of the at least one motor.

9. The control circuit of claim 8, further comprising a second core disposed between an external power source and the converter,
wherein the central frequency is 450 kHz, the first operating frequency is 350 kHz, and the second operating frequency is 550 kHz, and
wherein the number of windings is 19Ø or 14Ø.

10. The control circuit of claim 9, wherein the external power source is a commercial AC power source,
wherein the first state is a default state of the relay, and wherein the at least one motor performs a washing operation in the first state and a draining operation in the second state.

11. A dishwasher comprising:
a control circuit,
wherein the control circuit comprises:
a converter configured to convert alternating current (AC) power into direct current (DC) power;
an inverter configured to generate driving power of at least one motor using the DC power; and
a first core formed by winding a coil by a number of windings determined in correspondence with an impedance of the at least one motor,
wherein the number of windings is determined such that an impedance of the first core is inversely proportional to the impedance of the at least one motor, and
wherein a driving power line for driving the at least one motor passes through a center of the first core.

12. The dishwasher of claim 11, wherein the at least one motor is a three-phase motor driven by three driving power applied to a first power line, a second power line, and a third power line, respectively, and
wherein the first power line, the second power line, and the third power line pass through the center of the first core.

13. The dishwasher of claim 12, wherein the number of windings is determined such that the impedance of the first core exceeds the impedance of the at least one motor in a first range of operating frequencies of the least one motor.

14. The dishwasher of claim 13, wherein the first range is a range between a first operating frequency and a second operating frequency, and
wherein a difference between the impedance of the first core and the impedance of the at least one motor is the greatest at a central frequency of the first range.

15. The dishwasher of claim 14, wherein the central frequency is a primary resonant frequency of the at least one motor.

16. The dishwasher of claim 15, wherein the control circuit further comprises:
a relay configured to perform a switching operation of the first power line and the second power line; and
a control unit configured to control the inverter and the relay.

17. The dishwasher of claim 16, wherein the relay controls the switching operation such that the first power line and the second power line are connected to a first motor of the at least one motor in a first state, and the first power line and the second power line are connected to a second motor of the at least one motor in a second state.

18. The dishwasher of claim 17, wherein the inverter is configured to generate the three driving power using the DC power corresponding to a load condition of the at least one motor.

19. The dishwasher of claim 18, wherein the control circuit further comprises a second core disposed between an external power source and the converter,
wherein the central frequency is 450 kHz, the first operating frequency is 350 kHz, and the second operating frequency is 550 kHz, and
wherein the number of windings is 19Ø or 14Ø.

20. The dishwasher of claim 19, wherein the external power source is a commercial AC power source,
wherein the first state is a default state of the relay, and wherein the at least one motor is performs a washing operation in the first state and a draining operation in the second state.

\* \* \* \* \*